(12) United States Patent
Challenger et al.

(10) Patent No.: US 8,392,827 B2
(45) Date of Patent: Mar. 5, 2013

(54) METHOD FOR GENERATION AND ASSEMBLY OF WEB PAGE CONTENT

(75) Inventors: James R. H. Challenger, Garrison, NY (US); Paul M. Dantzig, Scarsdale, NY (US); Robert Filepp, Westport, CT (US); Ronald Mraz, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1449 days.

(21) Appl. No.: 09/845,708

(22) Filed: Apr. 30, 2001

(65) Prior Publication Data

US 2003/0023640 A1    Jan. 30, 2003

(51) Int. Cl.
*G06F 17/00* (2006.01)

(52) U.S. Cl. ......... 715/255; 715/205; 715/234; 715/249

(58) Field of Classification Search ............... 713/176, 713/180; 380/201, 203, 232, 522–523; 715/501.1, 715/513, 522–523, 500, 205–208, 234, 248–249, 715/255; 382/232, 201, 203
See application file for complete search history.

(56) References Cited

U.S. PATENT DOCUMENTS

| | | | |
|---|---|---|---|
| 5,347,632 A | 9/1994 | Filepp et al. | 709/202 |
| 5,488,664 A | 1/1996 | Shamir | 380/54 |
| 5,530,759 A | 6/1996 | Braudaway et al. | 380/54 |
| 5,745,360 A | 4/1998 | Leone et al. | 715/513 |
| 5,796,967 A | 8/1998 | Filepp et al. | 345/764 |
| 5,825,892 A | 10/1998 | Braudaway et al. | 380/51 |
| 5,875,249 A | 2/1999 | Mintzer et al. | 380/54 |
| 5,884,014 A | 3/1999 | Huttenlocher et al. | 358/1.15 |
| 5,999,912 A | 12/1999 | Wodarz et al. | 705/14 |
| 6,021,426 A | 2/2000 | Douglis et al. | 709/200 |
| 6,026,413 A | 2/2000 | Challenger et al. | 707/202 |
| 6,052,730 A * | 4/2000 | Felciano et al. | 709/225 |
| 6,061,698 A | 5/2000 | Chadha et al. | 715/513 |
| 6,119,137 A | 9/2000 | Smith et al. | 715/523 |
| 6,151,609 A * | 11/2000 | Truong | 715/505 |

(Continued)

FOREIGN PATENT DOCUMENTS

| | | |
|---|---|---|
| CA | 1338423 | 6/1996 |
| HK | 1024380 | 8/2000 |

(Continued)

OTHER PUBLICATIONS

Lemay et al, "Laura Lemay's Web Workshop Creating Commercial Web Pages", Sams.net, 1996, pp. 110-115).*

(Continued)

*Primary Examiner* — Thu Huynh
(74) *Attorney, Agent, or Firm* — F. Chau & Associates, LLC; Preston J. Young, Esq.

(57) ABSTRACT

A method for dynamically converting electronically encoded HTML document from a text format to an image format. The method includes receiving a request for the content from a client, obtaining the content in text format, determining a content creation preference, and converting the content in text format to content in the image format according to the content creation preference. The method includes replying to the request, wherein the reply includes the content in the image format. The method applies a watermark to the content in the image format according to a watermarking preference. The method generates an image map in accordance with a mapping preference, wherein the image map relates selectable spatial display coordinates to external document identifiers.

13 Claims, 3 Drawing Sheets

U.S. PATENT DOCUMENTS

| | | | |
|---|---|---|---|
| 6,333,031 B1* | 12/2001 | Olsson et al. | 424/93.7 |
| 6,411,725 B1* | 6/2002 | Rhoads | 382/100 |
| 6,427,020 B1* | 7/2002 | Rhoads | 382/100 |
| 6,614,914 B1* | 9/2003 | Rhoads et al. | 382/100 |
| 6,618,484 B1* | 9/2003 | Van Wie et al. | 380/232 |
| 6,700,993 B1* | 3/2004 | Minematsu | 382/100 |
| 6,782,509 B1* | 8/2004 | Hirayama et al. | 715/210 |
| 6,900,905 B2* | 5/2005 | Simpson et al. | 358/1.15 |
| 6,947,571 B1* | 9/2005 | Rhoads et al. | 382/100 |
| 2002/0059162 A1* | 5/2002 | Shinoda et al. | 707/1 |
| 2002/0073074 A1* | 6/2002 | Sweet et al. | 707/2 |
| 2002/0191809 A1* | 12/2002 | Kirovski et al. | 382/100 |
| 2003/0012548 A1* | 1/2003 | Levy et al. | 386/46 |
| 2003/0056103 A1* | 3/2003 | Levy et al. | 713/176 |
| 2003/0190054 A1* | 10/2003 | Troyansky et al. | 382/100 |
| 2004/0037449 A1* | 2/2004 | Davis et al. | 382/100 |

FOREIGN PATENT DOCUMENTS

| | | |
|---|---|---|
| JP | 10307745 | 11/1998 |
| JP | 11327438 | 11/1999 |
| JP | 2000106627 | 4/2000 |
| JP | 2001282674 | 10/2001 |

OTHER PUBLICATIONS

"Using Netscape, The User-Friendly Reference", Ernst, W., Que, 1995, pp. 324-327.*

Lewis, R., "Adobe Pagemill 2.0 Handbook", Hayden Books, 1996, newly added chapter 1.*

Welcome to the First WWW Server in Bulgarian with DeleGate and CIILIB, http://web.archive.org/web/19990221192021/http://baka.aubg.bg/, 1995.*

Sakauchi et al, A Browsing Tool for Multi-lingual Documents for Users without Multilingual Fonts, pp. 63-71, ACM, 1996.*

English Abstract for Publication No. 10-307745.

English Abstract for Publication No. 11-327438.

English Abstract for Publication No. 2000-106627.

English Abstract for Publication No. 2001-282674.

* cited by examiner 302  304  306  308

This is the first hello
And this is the second hello
Now for something completely different.
And we conclude with a rousing adios.

METHOD FOR GENERATION AND ASSEMBLY OF WEB PAGE CONTENT

BACKGROUND OF THE INVENTION

1. Field of the Invention

The present invention relates to the generation and assembly of Web page content, and more particularly, to the dynamic inline assembly of a Web page from textual content.

2. Discussion of the Prior Art

The growth of the World Wide Web (Web) has been accelerated by advances in computing power and the burgeoning availability of bandwidth. Content providers can develop voluminous and complex content which may by transmitted from a host to a client in a relatively short time. However, the level of demand for this content often outstrips the ability of service providers and hosts to effectively support the content, leading to temporary shortages in Internet service. Within the evolving framework of the Web, dynamically assembled Web pages have been developed, in part, to satisfy the demand for content while reducing the impact on the service providers and hosts.

Dynamically assembled Web pages present content in the form of uniquely addressable elements. These elements may be obtained from different hosts across the network in a just-in-time fashion. For content providers, dynamic assembly is particularly desirable when Web page content changes frequently (e.g., stock prices) or is targeted to an end-user (e.g., personalized greetings). The advantages of dynamic assembly include, inter alia, content creation efficiencies and network transmission efficiencies. Content creation efficiencies may be realized when elements are created once and reused. Network transmission efficiencies can be realized when elements exhibiting varying lifetime attributes are independently stored and cached at locations close to the end-user.

Web pages may be characterized as static or dynamic. A static page includes content that is fixed over time, thus, each time the content is called by a browser, the same content is displayed. A dynamic page includes content which is generated upon being called. Therefore, dynamic pages can provide different content over time. Currently, prevalent Web browser implementations constrain the dynamic assembly of Web pages since, with the exception of HTML Frames, browsers do not support embedded or inline references to HTML elements. In other words, Web Browsers do not support embedded addressable HTML tags within another HTML element.

HTML Frames provide a means by which Web pages may be assembled from uniquely addressable HTML elements. However, the adoption of HTML Frames has been limited due to incompatibility in the implementation of Frames support between various Web Browsers and between different releases of the same Web browser. Furthermore, Frames need display coordinates or percentages to be pre-allocated. Accordingly, if the available display real-estate is not filled it may be wasted.

At present there are Web sites which dynamically assemble uniquely addressable elements to build Web pages for presentation to a user. However, these Web sites perform page assembly at a centralized server, or on the host side of the network, for transfer to the client as an atomic unit. Although Web page assembly is based on element usage and reuse, server side assembly does not result in greater content creation efficiency or greater network efficiency since Web pages are still transmitted as atomic units through the network to the end-user's Web browser.

Therefore, a need exists for a method of dynamic client-side Web page assembly using inline references to images including textual content.

SUMMARY OF THE INVENTION

According to an embodiment of the present invention, a method is provided for processing an HTML document. The method includes obtaining textual content, converting a portion of the textual content to a media file, storing the media file, and providing a tag within the HTML document referencing the stored media file, wherein the tag references the media file including the portion of the textual content. The media file may be a sound file or an image file.

An expression of an idea within the textual content is the property of an entity.

The image file can include a watermark. The watermark serves as a notice of the existence of a property right.

The method includes compressing the media file according to a compression preference.

The compression preference identifies a file format.

The media file is stored in one of a client-side database and a networked cache.

The method further includes generating an image map corresponding to the image file, according to a mapping preference. The mapping preference relates selectable spatial display coordinates to external document identifiers in order to enable user navigation.

Converting the textual content to the media file eliminates the use of scripting commands for presenting the textual content.

According to an embodiment of the present invention, a method is provided for converting electronically encoded document content from a text format to an image format. The method includes obtaining the electronically encoded document, determining a content creation preference, and extracting content from the electronically encoded document. The method further includes converting the content from the text format to the image format according to the content creation preference, and performing one of a transfer of the content in image format to a database and a transfer of the content in image format to a client.

The method includes applying a watermark to the content in the image format according to a watermarking preference. The method includes compressing the watermarked content in the image format according to a compression preference.

According to an embodiment of the present invention, a method for dynamically converting electronically encoded HTML content from a text format to an image format. The method includes receiving a request for the content from a client, obtaining the content in text format, determining a content creation preference, and converting the content in text format to content in the image format according to the content creation preference.

The method further comprises the step of extracting the content in text format from the obtained content in the text format. The method includes replying to the request, wherein the reply includes the content in the image format.

The method applies a watermark to the content in the image format according to a watermarking preference. The method includes compressing the watermarked image according to a compression preference.

The method generates an image map according to a mapping preference, wherein the image map relates selectable spatial display coordinates to external document identifiers.

The method includes storing the content in the image format. The method further includes generating an HTML document containing a reference to the stored content in the image format for retrieval and inline dynamic assembly by the client.

The method comprises receiving a client system request for verification of the watermarked content, verifying the watermarked content, and replying to the request for verification. The method includes receiving a client system request for verification of the watermarked content, determining whether a plurality of watermarking verification elements are present in the watermarked content, and determining whether a plurality of watermarking verification elements are current in the watermarked content. The method includes requesting the plurality of watermarking verification elements from a host via a secure communications link, receiving the requested watermarking verification elements from the host via the secured communications link, and storing the watermarking verification elements in storage local to the client system. The method obtains the watermarked image, verifies the watermark, and presents a verification result to the client system. The host is remote to the client. The storage local to the client includes one of a hard drive connected to the client and a networked cache.

According to an embodiment of the present invention, a program storage device is provided readable by machine, tangibly embodying a program of instructions executable by the machine to perform method steps for processing an HTML document. The method includes obtaining textual content, converting a portion of the textual content to a media file, storing the media file, and providing a tag within the HTML document referencing the stored media file, wherein the tag references the media file including the portion of the textual content. The media file is an image file. The image file includes a watermark.

The method steps further includes the step of generating an image map corresponding to the image file, according to a mapping preference.

BRIEF DESCRIPTION OF THE DRAWINGS

Preferred embodiments of the present invention will be described below in more detail, with reference to the accompanying drawings:

FIG. 3 is an example of an image according to an embodiment of the present invention.

DESCRIPTION OF THE PREFERRED EMBODIMENTS

Figure 1:
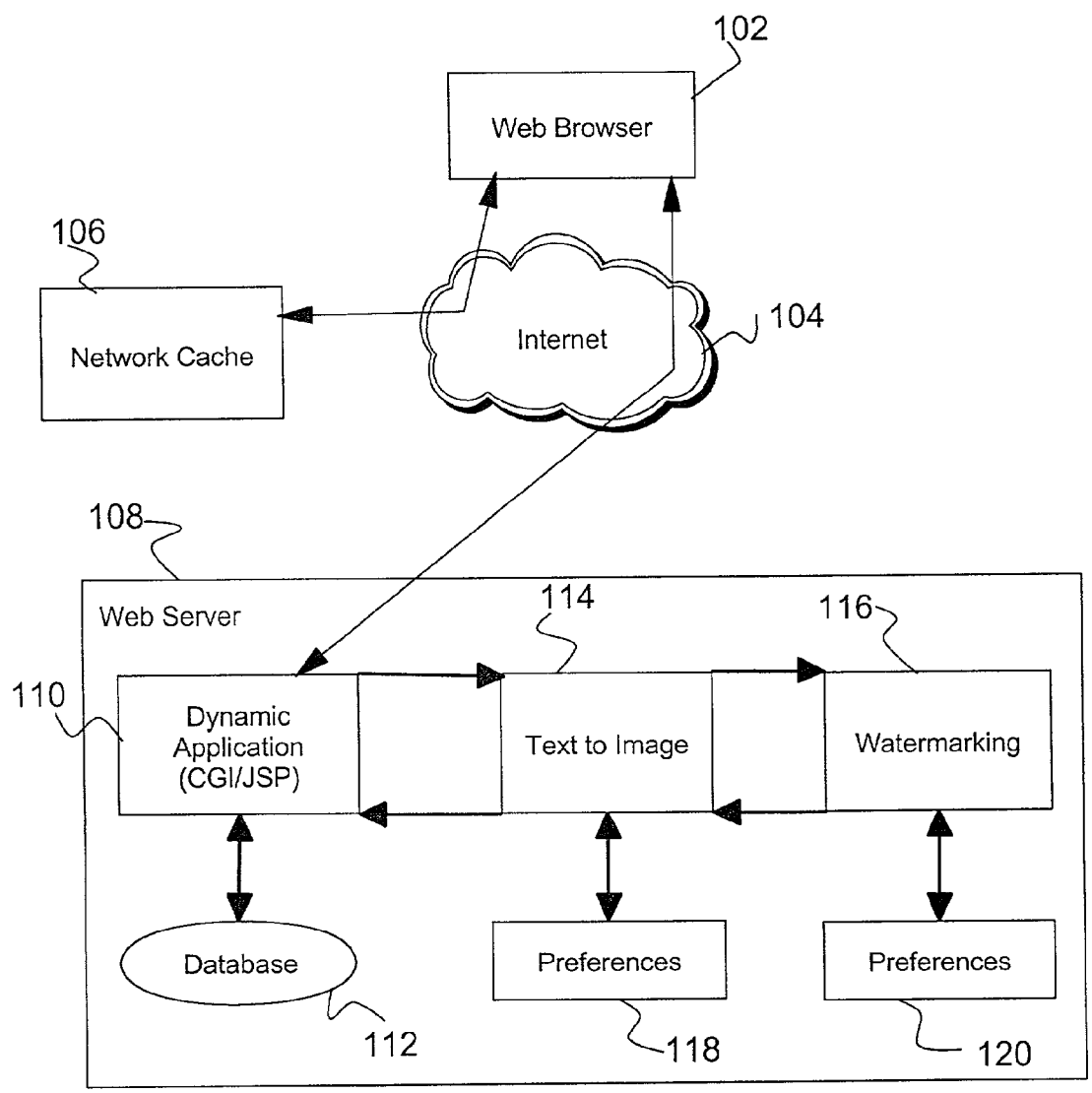
FIG. 1 is an illustration of a network including a client and Web server according to an embodiment of the present invention.

According to an embodiment of the present invention, a Web page can be assembled at an end-user's Web browser or client using Hypertext Markup Language (HTML) instructions including embedded tags referencing dynamic assembly images. The present invention has several advantages over the prior art. For example, server systems are relieved of the content creation costs related to the assembly of the Web page on behalf of the client. Further, network resources can be utilized more effectively by storing elements used to build the Web page closer to the client, for example, elements may be cached or stored on the client's local hard drive. In addition, the elements may cached throughout a distributed system, thus significantly reducing the volume of network traffic associated with the retrieval of the elements.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system elements and method steps depicted in the accompanying figures may be implemented in software, the actual connections between the system elements (or the process steps) may differ depending upon the manner in which the present invention is programmed. Given the teachings of the present invention provided herein, one of ordinary skill in the related art will be able to contemplate these and similar implementations or configurations of the present invention.

While current implementations of Web Browsers do not support embedded or inline references to HTML elements, they do support inline references to images. For example, browsers typically support inline Graphics Interchange Format (GIF) images, inline Joint Photographic Experts Group (JPEG) standards images, and Portable Network Graphics (PNG) images. Thus, an image may be dynamically retrieved and presented to the user by embedding an image tag, or <IMG> tag, within an HTML document being processed by the Web browser or client. The <IMG> tag may be expressed as: <IMG SRC="xxxx"> where xxxx represents an image's unique identifier, for example, a Uniform Resource Locator (URL) pointing to an image file on a network (e.g., the Internet). Image files may be inserted within an HTML document using <IMG> tags.

It should be noted that while it is possible to encode an HTML page such that it contains <IMG> tags referencing HTML files (e.g., <IMG SRC="xxxx.html">), the behavior of current Web Browsers is such that the file will not be processed when called. Rather, the browser may present a broken-image icon to the end-user.

In addition to the efficiencies of client side dynamic assembly of web pages, imagery is less vulnerable to adoption and/or modification by third parties than textual content. Therefore, a distributor can exercise greater control over Web page content by converting textual content to an image format prior to distribution.

According to an embodiment of the present invention, imagery can be digitally signed with a watermark. The addition of a watermark to a digital image servers to notify any party viewing or using the content of the existence of copyrights in the content. For example, in U.S. Pat. No. 5,530,759 entitled COLOR CORRECT DIGITAL WATERMARKING OF IMAGES, to G. W. Braudaway et al., a system for placing a visible watermark on an image is disclosed to discourage unauthorized use of the image. Invisible watermarking techniques may also be used in conjunction with the present invention. An invisible watermarking technique is disclosed in U.S. Pat. No. 5,875,249, entitled INVISIBLE IMAGE WATERMARK FOR IMAGE VERIFICATION, to F. C. Mintzer et al. The invisible watermarking system and method verifies image content using a stamping process and a verification key. The key is used to extract stamping information from the image. The extracted stamping information can be verified manually and/or automatically. In U.S. Pat. No. 5,488,664, entitled METHOD AND APPARATUS FOR PROTECTING VISUAL INFORMATION WITH PRINTED CRYPTOGRAPHIC WATERMARKS, to A. Shamir, a method and device is disclosed for protecting visual information against unauthorized access and modification using a printed cryptographic watermark which is encoded using black and white pixels. These patents (U.S. Pat. Nos. 5,530,759, 5,875,249 and 5,488,664) are examples of watermarking techniques including methods of watermark verification and are herein incorporated by reference in their entirety. The watermark itself can be explicitly displayed and perceptually noticeable in the textual imagery.

Thus, the present invention facilitates copyright protection for textual data, whether dynamically assembled or statically prepared, by providing a method for converting textual content to an image format which can then be watermarked. Textual imagery incorporating a digital watermark may be used in conjunction with an electronic copyright management system. Electronic copyright management systems function as clearing houses for digital content and the associated intellectual property rights. Typical electronic copyright management systems include a database of information relating to individual works, for example, the year of publication, the name of the copyright owner, etc., and a system of selling rights to those works. According to an embodiment of the present invention, by providing notification information in a watermark, the identification of copyrighted works and rights holders can be streamlined.

Referring to FIG. 1, a client's web browser 102 is connected to a networked cache 106 and a Web server 108 through the Internet 104. The Web server 108 includes a dynamic application 110 for retrieving client requested text from a database 112 and converting the text to imagery 114. The conversion may be according to a preference 118. The preference 118 is a content creation preference including attributes of the text, including font, font size, color, margins, etc. Content creation preferences may be used in the absence of other preferences, such as, presentation directives and attributes. Presentation directives, including for example, style sheets, may be used to provide formatting information specific to a particular HTML document. The Web server may watermark the imagery 116 with visible or invisible watermarks according to a watermarking preference 120. The watermarking preference 120 may specify attributes including, transparency of the watermark, the watermark image, etc. The web server delivers the requested text in the form of an image to the Web browser 102 through the Internet 104. The Web browser may cache the requested text on a local hard drive or on a network cache 106 across the Internet.

The present invention describes methods for building a Web page according to tags embedded within HTML elements. The Web page can be assembled dynamically by a Web browsers or client supporting HTML links to imagery. The method implements embedded references to dynamic assembled images including textual content within HTML pages. The method provides a means by which textual content can be converted to an image and packaged as a uniquely addressable HTML element. In addition, image maps may be used in conjunction with the imagery including textual content, enabling user navigation within a documents and to other Web pages. Image maps associate regions of an image (defined by x and y coordinates) to HREF links, or hyperlinks, which may be used to navigate a document and/or the Web.

Each image may include a digital watermark. To increase the network efficiency, the imagery may be compressed. Methods of compressing images are well known in the art and include, for example, image compression according to the JPEG standard, GIF image compression, or PNG compression.

For image compression, GIF and PNG compression algorithms are lossless, however, according to an embodiment of the present invention, lossy compression (e.g., JPEG) may be used. Typically, compression of textual content needs to be lossless to avoid altering the meaning of the text. However, according to the present invention, because the textual content is converted into imagery, errors introduced by the compression technique may not alter the meaning of the text. Therefore, a more aggressive compression algorithm, one which may introduce errors into the file, may be implemented to compress the imagery.

Figure 2:
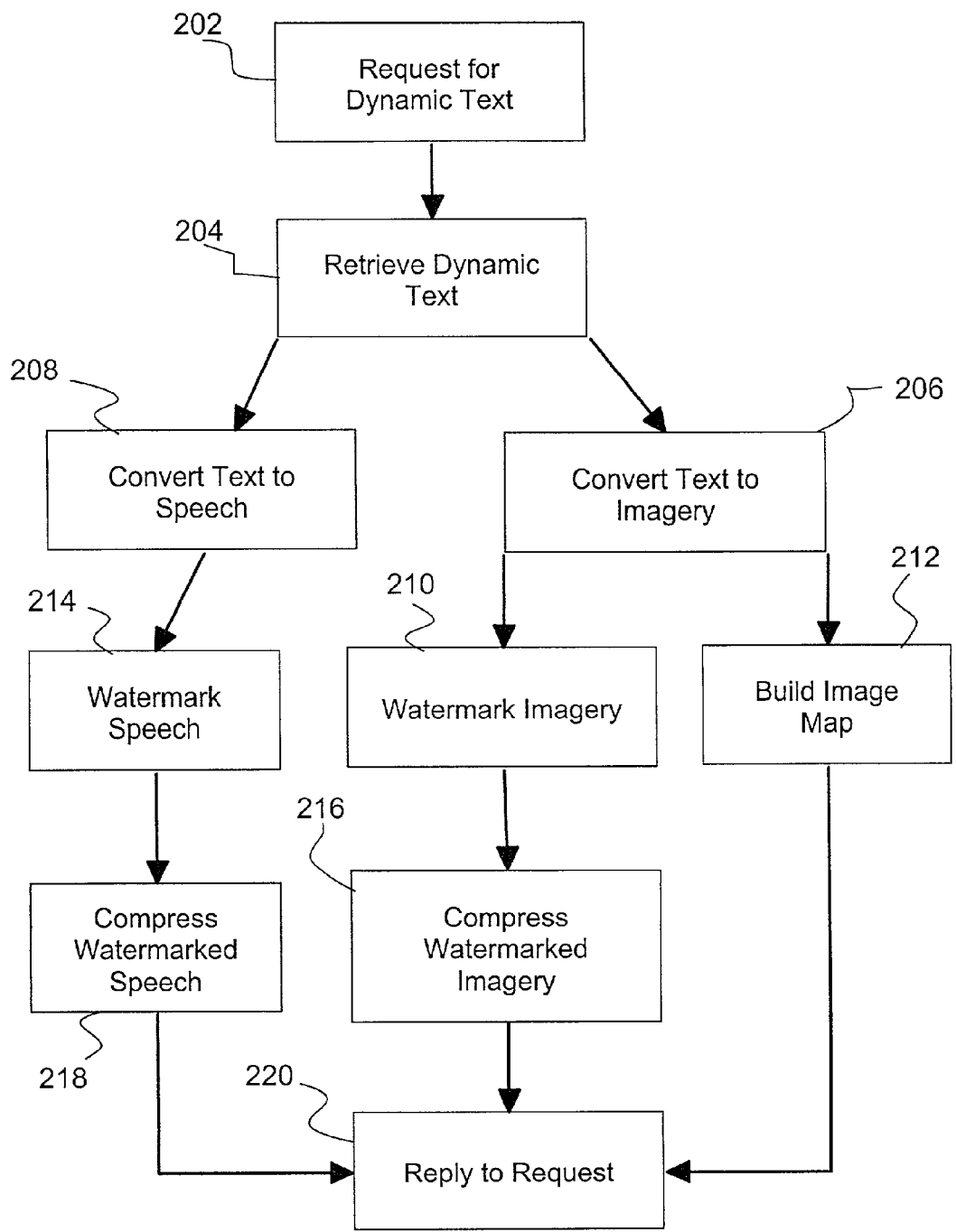
FIG. 2 is a flow diagram of the method of off-loading content to a client according to an embodiment of the present invention.

Referring to FIG. 2, the Web server receives a request of dynamic text 202 and retrieves the text 204 from a database or host. The text may be converted to imagery 206 and/or speech 208 (a sound file). The image of the text can be associated with an image map 212 for linking to anchors within the image or to other web pages. The image may be watermarked 210 and compressed 216. Likewise, methods of watermarking speech may also be implemented 214. Various sound formats may be used to compress the watermarked speech 218 including, wave files (.wav) and Audio Interchange File Format (.aif). The compressed imagery and/or sound file can be directed to the client 220 along with any corresponding image map.

According to an embodiment of the present invention, a watermark may be verified. A Web browser including a program, such as a plug-in, applet, etc., may examine the watermark and provide verification information. Verification information includes, for example, the presence of a watermark, the date the watermark was posted, the integrity of the watermark, and information about the content provider and the watermark.

The present invention contemplates the encryption of content. Static and dynamic content may be encrypted for restricted end user use. In addition, particular content referenced by an HTML document, for example, an individual image file, may be encrypted while other content is unencrypted. For example, encrypted content may be transmitted via a Secure Socket Layer (SSL) and Secure Hypertext Transfer Protocol (HTTPS) while other elements of an HTML document are transmitted via Hypertext Transfer Protocol (HTTP). A tag which references content may indicate whether the content is encrypted, for example, that the content referenced is to be transmitted via a secure communications means such as HTTPS or SHTTP, a security-enhanced version of HTTP. HTTPS and SSL support the use of digital certificates. Therefore, a client may authenticate the sender or host. Additional methods of encryption are contemplated by the present invention, these methods will be obvious to one of ordinary skill in the relevant art.

The mechanics of converting textual content to an image format, for example, the JPEG image standard, are provided in FIG. 3 and accompanying Appendixes 1 and 2. Appendixes 1 and 2 are provided as an example of an embodiment of the present invention and given the teachings of the present invention provided herein, one of ordinary skill in the related art will be able to contemplate these and similar implementations or configurations of the present invention.

Appendix 1 is the HTML code corresponding to FIG. 3. Appendix 2 includes a Java servlet for converting textual content to imagery. The servlet simulates a database lookup based on request parameters and returns a JPEG image created from textual content according to a set of parameters. The present invention has been written and tested on hardware implementing RedHat Linux 6.2 and IBM's Java 1.3.0, build cx130-20000815. The servlet engine used for the test was a Tomcat 3.1 engine from the Jakarta project at http://jakarta.apache.org.

FIG. 3 is an example of a browsers interpretation of an HTML document including both text and images including textual content. The images 304-310 created from textual content are in a different font to make it easier to visually differentiate the raw text, e.g., 302, from the images 304-310.

According to the present invention, the conversion of textual content to an image format may increase the amount of data sent through the network. This expansion may occur when small amounts of textual content are converted to images. However, this expansion is not linear. As more text is converted to imagery, the volume of data representing the images may not increase significantly. Further, by converting from textual content to an image format, the need for scripting commands, including style sheets, may be eliminated. By eliminating scripting commands the volume of imagery data to be distributed may be reduced as compared to textual data. Appendixes 3 and 4 show the HTML code for a Web site including the results of single tennis match. Appendixes 3 and 4 are provided as an example of an embodiment of the present invention and given the teachings of the present invention provided herein, one of ordinary skill in the related art will be able to contemplate these and similar implementations or configurations of the present invention. Appendix 4 shows the HTML code for the Web site using <IMG> tags to imagery including the textual content of Appendix 3. In addition, Appendix 4 includes an image map linking different areas of the image "tennis.jpg" to additional HTML documents within the Web site.

According to an embodiment of the present invention, the processing load on the client may be significantly reduced. Currently, Web Browsers need to devote significant processing power to the parsing and rendering of HTML text. By presenting textual content to the client in the form of an image, the overhead associated with parsing and rendering may be reduced or eliminated.

According to an embodiment of the present invention, the attributes of the content can be assured regardless of the client's implementation. Currently, different client implementations, such as, Microsoft's® Internet Explorer and Netscape's® Navigator, may interpret markup tags and style sheets in conflicting manners. Different clients may present the same textual content quite differently. It is a challenge to the developer of content to account for the differences in rendering between the variety of implementations. According to an embodiment of the present invention, difficulties caused by the differences between browsers are avoided by providing content to the client in the form of an immutable image which does not require modification or interpretation by a browser.

Through the implementation of a digital signature, the present invention notifies readers of a signed document of the existence of intellectual property rights, including but not limited to, those rights due to a work under §§401-414 of Title 17 United States Code. The digital signatures may be, among other things, a watermark in the text based imagery. The present invention describes a method by which textual content is transformed to an image format suitable for dynamic assembly by a Web browser. The present invention also describes methods by which textual data may be copyright protected, whether dynamically assembled or statically prepared, by providing a means to dynamically convert textual content to an image format including a digital watermarks.

According to yet another embodiment of the present invention, textual content may be converted to aural content. Aural content may be provided in conjunction with imagery to enhance the depth of content provided, and making Web page content accessible to sight impaired users. Methods of converting text to speech are well known in the art. Various methods of sound compression may be used, for example, .wav files and MP3's (MPEG-1 Audio Layer-3), to reduce the load on networking facilities. The present invention provides for watermarking speech. Speech may be watermarked by using, for example, explicit copyright information in the speech or incompressible sound (e.g., out of the hearing range of the user or background noise) which may be detected using a computer program.

Having described embodiments of a method and system for creation of dynamically assembled web pages, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

What is claimed is:

1. A computer-implemented method for dynamically converting electronically encoded HTML textual content from a text format to an image format, comprising the steps of:
receiving a request for the textual content from a client;
obtaining, at a server, the textual content in text format;
determining a content creation preference stored on the server;
converting, automatically by the server, the textual content in text format to the textual content in the image format according to the content creation preference;
storing the textual content in the image format;
generating an HTML document containing an inline reference to the stored textual content in the image format for retrieval and dynamic assembly by the client; and
replying to the request by serving the HTML document containing the inline reference to the stored textual content in the image format, wherein the reply does not include the textual content in the image format.

2. The method of claim 1, further comprising the step of extracting the content in text format from the obtained content in the text format.

3. The method of claim 1, further comprising the step of applying a watermark to the content in the image format according to a watermarking preference.

4. The method of claim 3, further comprising the step of compressing the watermarked image according to a compression preference stored on the server.

5. The method of claim 3, further comprising the steps of:
receiving a client system request for verification of the watermarked content;
verifying the watermarked content; and
replying to the client system request for verification.

6. The method of claim 1, further comprising the step of generating an image map according to a mapping preference, wherein the image map relates selectable spatial display coordinates to external document identifiers.

7. The method of claim 1, wherein the content creation preference specifies attributes of the textual content in image format.

8. The method of claim 7, wherein the attributes of the textual content in image format include at least one of font, font size, color, and margins.

9. The method of claim 1, further comprising:
receiving a request from the client for the textual content in the image format according to the inline reference, wherein the inline reference is a Uniform Resource Locator (URL); and
replying to the request from the client for the textual content in the image format.

10. A computer-implemented method for dynamically converting electronically encoded HTML textual content from a text format to an image format, comprising the steps of:
receiving a request for the textual content from a client;
obtaining, at a server, the textual content in text format;
determining a content creation preference stored on the server;
converting, automatically by the server, the textual content in text format to the textual content in the image format according to the content creation preference;
storing the textual content in the image format as a uniquely addressable element identified by a Uniform Resource Locator (URL);
generating an HTML document containing an inline reference comprising the URL to the stored textual content in the image format for retrieval and dynamic assembly by the client; and
replying to the request by serving the HTML document containing the inline reference to the stored textual content in the image format, wherein the reply does not include the textual content in the image format.

11. The method of claim 10, further comprising applying a watermark to the content in the image format.

12. The method of claim 11, further comprising:
receiving a client system request for verification of the watermarked content;
verifying the watermarked content; and
replying to the client system request for verification.

13. The method of claim 10, further comprising compressing the textual content in the image format.

* * * * *